United States Patent
Gupta et al.

(10) Patent No.: US 7,406,487 B1
(45) Date of Patent: Jul. 29, 2008

(54) METHOD AND SYSTEM FOR PERFORMING PERIODIC REPLICATION USING A LOG

(75) Inventors: Vikas K. Gupta, Santa Clara, CA (US); Kedar M. Karmarkar, Sunnyvale, CA (US); Raghu Krishnamurthy, Cupertino, CA (US)

(73) Assignee: Symantec Operating Corporation, Cupertino, CA (US)

( * ) Notice: Subject to any disclaimer, the term of this patent is extended or adjusted under 35 U.S.C. 154(b) by 699 days.

(21) Appl. No.: 10/652,380

(22) Filed: Aug. 29, 2003

(51) Int. Cl.
*G06F 17/30* (2006.01)

(52) U.S. Cl. .................. 707/204; 707/201; 707/202; 711/162

(58) Field of Classification Search .......... 707/1–10, 707/200–206, 100–104.1; 711/114, 155–156, 711/161–165, 171; 714/6
See application file for complete search history.

(56) References Cited

U.S. PATENT DOCUMENTS

| | | | | |
|---|---|---|---|---|
| 5,734,818 | A * | 3/1998 | Kern et al. | 714/20 |
| 6,088,706 | A * | 7/2000 | Hild | 707/202 |
| 6,131,148 | A * | 10/2000 | West et al. | 711/162 |
| 6,487,561 | B1 * | 11/2002 | Ofek et al. | 707/204 |
| 6,647,474 | B2 * | 11/2003 | Vishlitzky et al. | 711/162 |
| 6,728,848 | B2 * | 4/2004 | Tamura et al. | 711/162 |
| 6,732,124 | B1 * | 5/2004 | Koseki et al. | 707/202 |
| 6,779,093 | B1 * | 8/2004 | Gupta | 711/162 |
| 6,907,507 | B1 * | 6/2005 | Kiselev et al. | 711/162 |
| 7,054,960 | B1 * | 5/2006 | Bezbaruah et al. | 710/33 |
| 7,089,385 | B1 * | 8/2006 | Kiselev et al. | 711/162 |

OTHER PUBLICATIONS

Tatsushi Inagaki etal., Supporting Software Distributed Shared Memory with an Optimizing Compiler, IEEE, Aug. 10-14, 1998, 225-235.*
Jenwei Hsieh et al., Performance Evaluation of Software RAID vs. Hardware RAID for Parallel Virtual File System, IEEE, 2002, 1-7.*

* cited by examiner

*Primary Examiner*—Jean B Fleurantin
(74) *Attorney, Agent, or Firm*—Campbell Stephenson LLP

(57) ABSTRACT

Disclosed is a method and system for performing periodic replication using a write-ordered log. According to one embodiment, a plurality of write operations to a primary data volume are tracked using a write operation log and then data associated with the plurality of write operations is replicated to a secondary data volume by coalescing the plurality of write operations utilizing the write operation log and transferring data associated with the plurality of write operations to the secondary data volume. According to another embodiment the described tracking includes storing metadata associated with the plurality of write operations within the write operation log. In another embodiment, the described coalescing includes identifying a non-overlapping portion of a first write operation and a second write operation of the plurality of write operations utilizing the metadata.

15 Claims, 7 Drawing Sheets

Synchronous Replication

*Asynchronous Replication*

*Periodic Replication*

METHOD AND SYSTEM FOR PERFORMING PERIODIC REPLICATION USING A LOG

BACKGROUND

1. Technical Field

The present invention relates to data storage and retrieval generally and more particularly to a method and system for performing periodic replication using a log.

2. Description of the Related Art

Data replication products replicate data associated with application write operations or "updates" over a network to remote sites, making the replicated data available for processing (e.g., backup, disaster recovery, decision support, data mining, etc.). Conventional data replication products offer different modes of replication each offering different guarantees on the content and availability (recovery point and recovery time) of the data at the remote site. Such replication modes typically fall into one of three categories, synchronous, asynchronous and periodic.

When replicating synchronously, a replication product maintains secondary site data completely up to date with respect to primary site data. An application write operation on a synchronously replicated data volume completes as soon as the update is logged at the primary site, and, transmitted to and acknowledged by all secondary sites. In this mode of replication, a remote site is always up-to-date or "current" and consistent. Synchronous replication has the overhead of including a network round trip time to each write operation service time and hence tends to decrease application performance.

In asynchronous replication, the transfer of a write to a secondary site occurs outside of the main input/output (I/O) path. A log is used to record each write and the write operation request is indicated as complete to the requesting application once the write has been logged. The logged writes are then sent "asynchronously" to each remote site while maintaining write-order fidelity and consequently consistency. Synchronization between primary and remote secondary data volumes is not consistently maintained in an asynchronously replicated system however and consequently secondary data volumes cannot be relied on to be "up-to-date" at any given instant.

Utilizing conventional periodic replication, changes or "updates" to a primary data volume stemming from application write operations are tracked using a change map. Each remote site is then incrementally synchronized using the tracked changes at periodic or scheduled intervals. In a typical periodic replication system, such change maps are implemented as bitmaps where each bit represents a region in the data volume or "set" to be replicated. Consistency is maintained by atomically synchronizing secondary data volumes with all changes which took place during a given tracking period or interval. Accordingly, each remote site in a periodically replicated system is "current" up to the last synchronization event that occurred.

A significant drawback associated with both synchronous and asynchronous modes of replication is that data may be inefficiently or unnecessarily transmitted over an associated network if the same blocks of the primary data volume are written to multiple times (e.g., with identical data due to the operation of an application or with different data where the final write operation is the only one of importance). While periodic replication avoids this disadvantage by transferring cumulative data changes occurring over a period of time, because each write operation can "dirty" a large data volume region data, periodic replication may also result in the unnecessary transmission of unchanged data when there is little spatial locality of writes.

SUMMARY

Disclosed is a method and system for performing periodic replication using a log. During a synchronization phase of periodic replication writes tracked using the log are coalesced so that any overlapping regions are eliminated and the amount of data which is transferred over a network may be reduced.

According to one embodiment, a plurality of write operations to a primary data volume are tracked using a log and then data associated with the plurality of write operations is replicated to a secondary data volume by coalescing the plurality of write operations utilizing the log and transferring data associated with the plurality of write operations to the secondary data volume.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Figure 1:
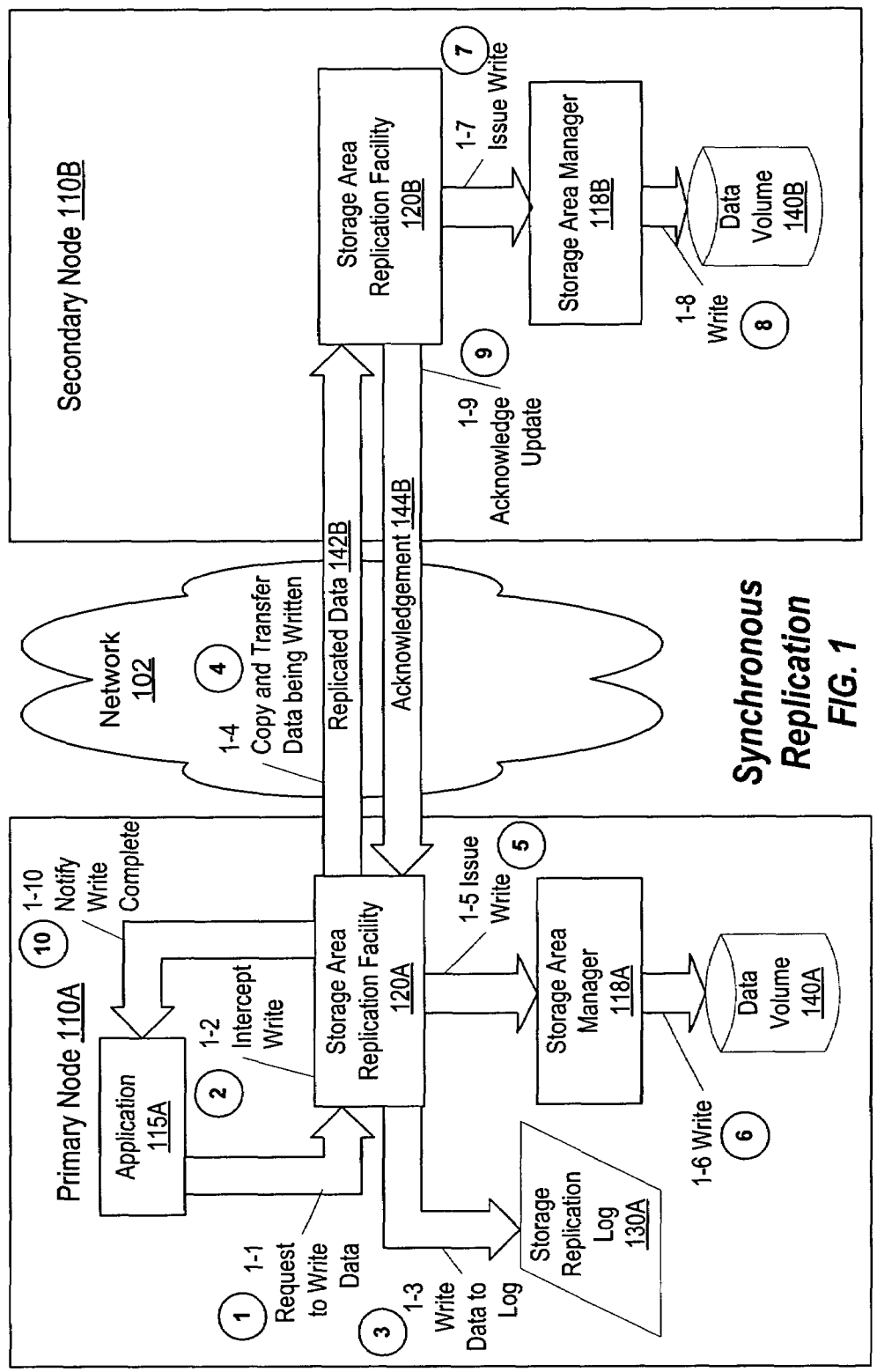
FIG. 1 illustrates a system for replicating data from a primary data volume to a secondary data volume utilizing synchronous replication.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention include methods, systems, and machine-readable media for performing periodic replication using a log.

During data replication, a primary data volume at a first site is replicated to maintain a consistent copy of data on a secondary data volume. Typically, a secondary data volume is remote from the physical location of the primary data volume and can be accessed via a network, although it is not a requirement that the secondary data volume be physically remote. Each of the primary and secondary data volumes may be part of a cluster in which multiple data processing systems are configured to serve either as an active node or a backup node for the cluster.

A given data volume can serve as a primary data volume with respect to one storage replication system, and a secondary data volume for another storage replication system. Furthermore, a given data volume can serve as a secondary data volume at one point in time, and later as a primary data volume to "cascade" replication of the data to other nodes connected via communication links. For example, a first replication may be made between data volumes in different cities or states, and a data volume in one of those cities or states can then serve as the primary data volume for replicating the data worldwide.

Each primary data volume can have more than one associated secondary data volume. As used herein, a reference to the secondary data volume implicitly refers to all secondary data volumes associated with a given primary data volume because the same replication operations are typically performed on all secondary data volumes.

Replication is unidirectional for a given set of data. Writes of data on the primary data volume are sent to the secondary data volumes, but access to the data at the secondary data volumes is typically read-only. If read/write access to a secondary set of data is required (after a primary data volume failure, for example), replication can be halted for that set of data or a snapshot of the secondary set of data can be made while continuing replication. If data are then written to storage areas on secondary data volumes, a synchronization process can be performed when the primary data volume becomes available again so that both sets of data are again identical before resuming replication of data.

The unit of storage in a given storage area or volume is referred to herein as a "block," as block terminology is typically used to describe units of storage of disk volumes. Again, one of skill in the art will recognize that the unit of storage can vary according to the type of storage area, and may be specified in units of bytes, ranges of bytes, files, or other types of storage objects. The use of the term "block" herein is not intended to be limiting and is used herein to refer generally to any type of storage object.

Some types of storage areas, such as disk volumes, store data as a set of blocks. Each block is typically of a fixed size; a block size of 512 bytes is commonly used. Thus, a volume of 1000 Megabyte capacity contains 2,048,000 blocks of 512 bytes each. Any of these blocks can be read from or written to by specifying the block number (also called the block address). Typically, a block must be read or written as a whole.

Data consistency is ensured by coordinating operations such that they occur in the same order on each secondary data volume as on the primary data volume. Consequently, data storage modifications occur in the same order on both the secondary and the primary. If a primary or secondary data volume fails, recovery includes locating the last entry that had not yet been acknowledged on the secondary data volume as having been successfully written before the failure. Operation can continue from that point. However, a set of requests may exist between the last acknowledged request and the last request that was sent to the replication storage area before the failure. The data changed in this set of requests may or may not have been written to the secondary data volume.

FIG. 1 illustrates a system for replicating data from a primary data volume to a secondary data volume utilizing synchronous replication. Primary node 110A and secondary node 110B can be implemented as data processing systems as are known in the art, including a processor (not shown) for executing instructions and a memory (not shown) for storing the instructions, as an integrated circuit (e.g., a Field Programmable Gate Array, or Application Specific Integrated Circuit) configured to perform the functionality of such instructions, or any mechanical device configured to perform such functions. Data processing systems, including computer systems in the form of network appliances configured to perform tasks such as replication, are described in further detail with reference to FIG. 7 herein.

Primary node 110A includes an application program 115A. Application program 115A can be a database, a file system, or a user-level application program. The present invention operates independently of the type of data and/or unit of storage of the data. Storage area manager 118A and storage area replication facility 120A obtain data to be written from application program 115A. Storage area replication facility 120A stores the data in data volume 140A via storage area manager 118A, which communicates directly with storage hardware for data volume 140A. It is within the scope of the invention that data volume 140A can include multiple storage objects, such as individual blocks making up a storage volume disk.

Secondary node 110B can include corresponding copies of application 115A (not shown). These respective copies can perform the functions of primary node 110A in the event of disaster, although none of these programs must be executing for performing replication or synchronization in accordance with embodiments of the present invention. Alternatively, programs and other files associated with an application, database and/or file system may be stored in a data volume or "storage area" on the primary node and replicated along with the data. Should the secondary node itself need to manage the data, the programs and other files can be extracted from the replicated data and executed at the secondary node.

Corresponding copies of storage area manager 118A and storage area replication facility 120A also reside on secondary node 110B, (e.g., storage area manager 118B and storage area replication facility 120B, respectively). These copies enable secondary node 110B to perform functions similar to those performed at primary node 110A and to manage storage areas and replicate data to other secondary nodes if necessary.

Shown in FIG. 1 are operations for a synchronous write operation. Operation numbers for operations and sets of operations described in FIGS. 1 through 4 are provided as encircled text for the reader's convenience. Assume that data in data volume 140A on node 110A and data volume 140B on node 110B are initially synchronized. In operation 1-1, application 115A requests storage area manager 118A to write data. However, in operation 1-2, storage area replication facility 120A intercepts the write command on its way to storage area manager 118A. Storage area replication facility 120A writes the data to storage replication log 130A in operation 1-3. The data may be written directly to storage location 140A or into a memory buffer that is later copied to data volume 140A.

In operation 1-4 of FIG. 1, storage area replication facility 120A copies data to be written by storage area manager 118A, referred to as replicated data 142B, and initiates a transfer of replicated data 142B to data volume 140B. In operation 1-5, storage area replication facility 120A asynchronously issues a write command to storage area manager 118A to write the data to data volume 140A. The described operations of writing data to a log, writing data to a local storage area, and sending data to a secondary node (respectively, operations 1-3, 1-4, and 1-5) may start and/or complete in any order and may be performed in parallel. In some embodiments, it is preferable to complete writing data to the log before beginning to copy the data to a secondary node; in other embodiments, for example, where a storage replication log is also used on secondary node 110B, operation 1-3 to write the data to the log may be performed in parallel.

In operation 1-6, storage area manager 118A writes the data to data volume 140A. Because the updated data resulting from the write operation is sent to a node that is updated synchronously, storage area replication facility 120A waits until an acknowledgement is received from storage area replication facility 120B before notifying application 115A that the write operation is complete.

Data transfer is typically performed over a communication link, such as network 102, between the primary and secondary nodes. Upon receiving replicated data 142B, in operation 1-7, storage area replication facility 120B on node 110B issues a write command to storage area manager 118B. In operation 1-8, storage area manager 118B writes the data directly to data volume 140B. In operation 1-9, storage area manager replication facility 120B sends acknowledgement 144B indicating that the update has been received on node 110B. Note that storage area replication facility 120B is not shown writing data to a log, such as storage replication log 130A of primary node 110A. However, secondary nodes, such as secondary node 110B, may also write data to a log and/or memory buffer and acknowledge receipt of the data when the data are written to the log and/or memory buffer. In such a case, it is possible that the acknowledgement upon writing to data in the log and/or memory buffer in operation 1-9 may be performed in parallel with the write to data volume 140B in operations 1-7 and 1-8. Furthermore, it is not necessary that write operation performed in operations 1-5 and 1-6 on primary node 110A be performed before the write operations performed in operations 1-7 and 1-8 on secondary node 110B; these operations may be performed in any order.

Upon receiving acknowledgement 144B, in operation 1-10, storage area replication facility 120A on node 110A notifies application 115A that the write operation is complete. The synchronous write operation is then complete with respect to secondary node 110B. As mentioned previously, synchronous replication includes operations similar to 1-1 through 1-10 for each secondary node when multiple secondary nodes exist.

Figure 2:
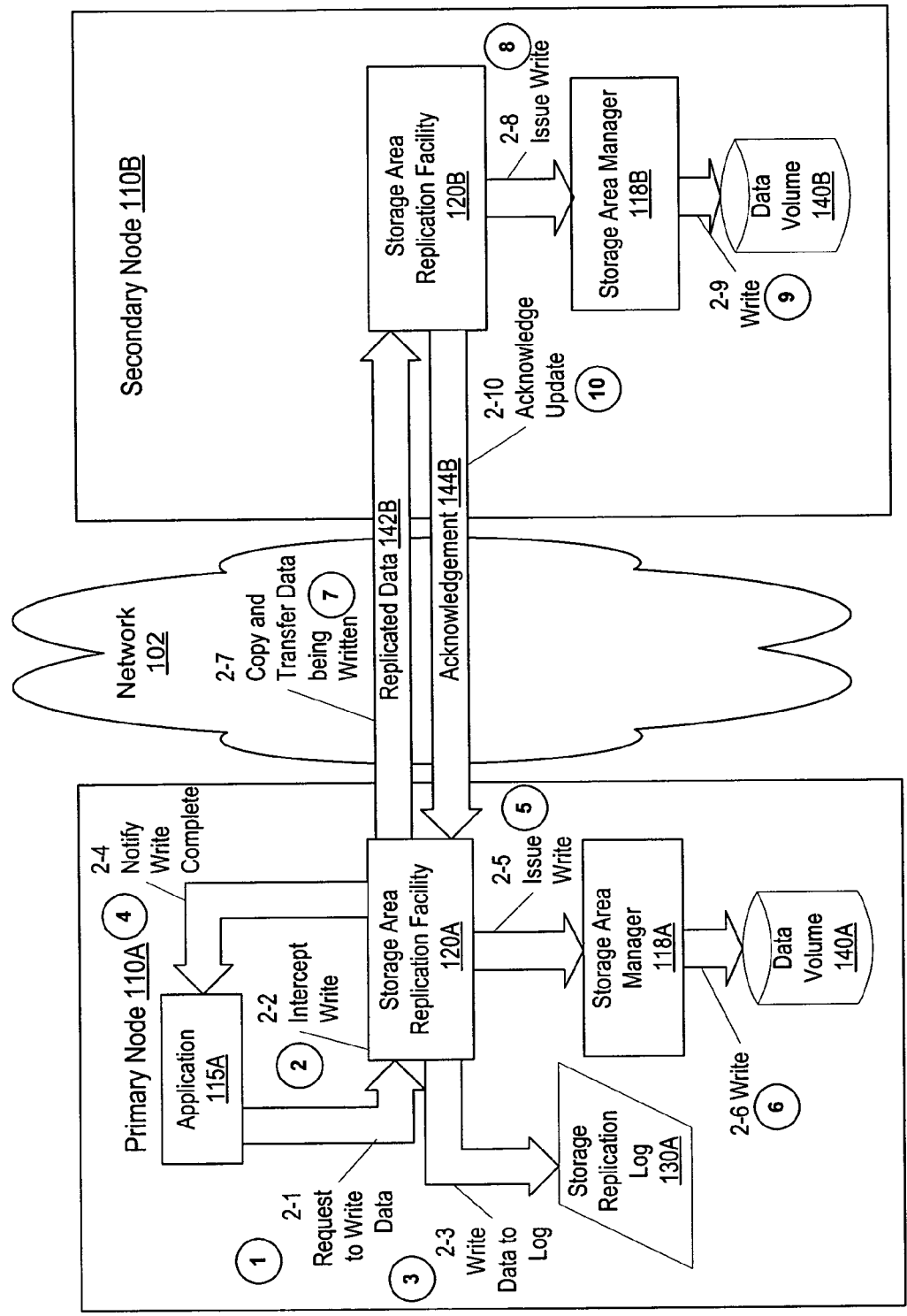
FIG. 2 illustrates a system for replicating data from a primary data volume to a secondary data volume utilizing asynchronous replication.

Referring to FIG. 2, a system for replicating data from a primary data volume to a secondary data volume utilizing asynchronous replication is illustrated. Again assume that the data in data volume 140A on node 110A and data volume 140B on node 110B are initially synchronized. In operation 2-1, application 115A requests storage area manager 118A to perform a write operation. In operation 2-2, storage area replication facility 120A intercepts the write command on its way to storage area manager 118A, and in operation 2-3, storage area replication facility 120A writes the data to storage replication log 130A. In operation 2-4, storage area replication facility 120A notifies application 115A that the write operation is complete. In contrast to FIG. 1, this notification is sent without receiving an acknowledgement from storage area replication facility 120B because data are being replicated to secondary node 110B asynchronously. In operation 2-5, storage area replication facility 120A issues a write command to storage area manager 118A, and in operation 2-6, storage area manager 118A writes the updated data to data volume 140A. In operation 2-7, storage area replication facility 120A copies the data to be written by storage area manager 118A, referred to as replicated data 142B, and transfers replicated data 142B to storage area replication facility 120B on secondary node 110B.

As described with reference to FIG. 1, writing data to a log, initiating a write of data to a local storage area, and sending data to a secondary node (respectively, operations 2-3, 2-5, and 2-6) may start and/or complete in any order and may be performed in parallel. It is necessary however, with asynchronous replication, that operation 2-3, (writing data to a log), is performed prior to operation 2-4, (notifying application 115A that the write operation is complete).

Upon receiving replicated data 142B, in operation 2-8, storage area replication facility 120B on node 110B issues a write command to storage area manager 118B. In operation 2-9, storage area manager 118B writes the updated data to data volume 140B. In operation 2-10, storage area replication facility 120B sends acknowledgement 144B to storage area replication facility 120A on node 110A. The asynchronous write operation is then complete with respect to secondary node 110B. As mentioned previously, replicated data 142B may instead be written to a log and/or memory buffer and acknowledged when the write operation to the log and/or memory buffer is completed. Moreover, asynchronous replication may include operations similar to 2-1 through 2-10 for each secondary node when multiple secondary nodes exist.

Figure 3:
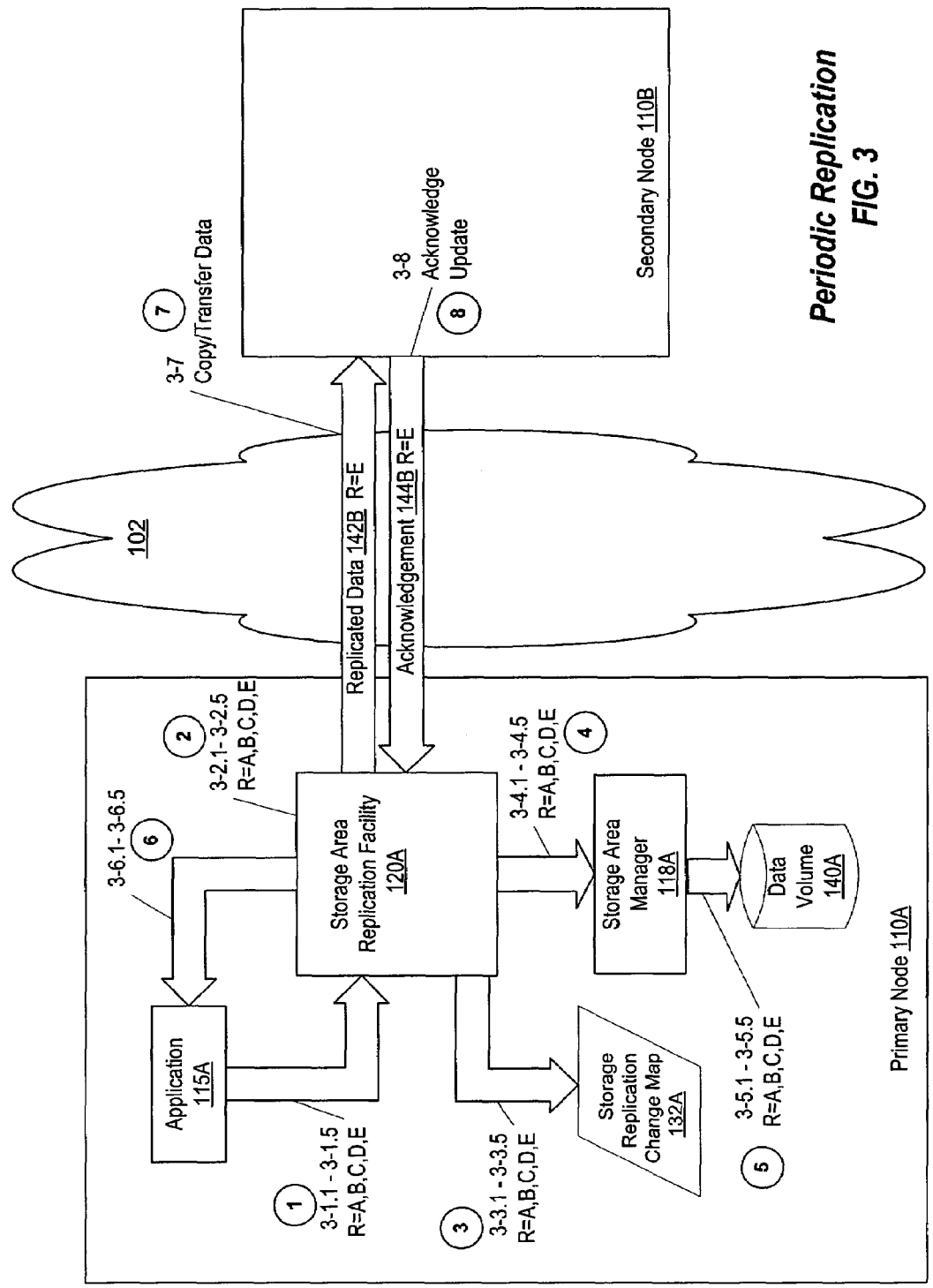
FIG. 3 illustrates a system for replicating data from a primary data volume to a secondary data volume utilizing periodic replication.

FIG. 3 illustrates a system for replicating data from a primary data volume to a secondary data volume utilizing periodic replication. Assume that the data in data volumes 140A and 140B (on primary node 110A and secondary node 110B, respectively) are initially synchronized.

Operations 3-1.1 through 3-1.5 represent a set of requests to write a series of values to a region of data volume 140A. The described operations represent that a value "A" is initially written to the region, and subsequently overwritten with values "B", "C", "D", and "E" sequentially in time. Operations 3-2.1 through 3-2.5 represent a set of intercepts of the requests made in the set of operations 3-1.1 through 3-1.5 by storage area replication facility 120A. Operations 3-3.1 through 3-3.5 represent the storage of data (e.g., the storage of bits to indicate regions which have been modified) associated with the write operations represented by operations 3-1.1 through 3-1.5 by storage area replication facility 120A within storage replication change map 132A.

Operations 3-4.1 through 3-4.5 represent issuing the respective write operation for the current region value to data volume 140A, and operations 3-5.1 through 3-5.5 represent writing the respective value ("A", "B", "C", "D" or "E") to the region. Operations 3-6.1 through 3-6.5 represent notifying the initiating application 115A that the write operation is complete. The numbering of the operations is not intended to imply that all of the set of operations 3-1.1 through 3-1.5 must be completed before the set of operations 3-2.1 through 3-2.5 can begin. Operations within each write operation, such as operations 3-1.1, 3-2.1, 3-3.1, 3-4.1, 3-5.1, and 3-6.1 (requesting the write through notifying the initiating application 115A) should occur in sequence in a conventional periodic replication system.

When operations 3-1.1 through operations 3-6.5 are completed, the described region has been updated five times. During operation 3-6, replicated data 142B, in which the region has a value of "E", are additionally replicated to secondary node 110B. In operation 3-7, upon receiving replicated data 142B, activities occur on secondary node 110B to write a value of "E" to a corresponding region of a data volume on secondary node 110B. In operation 3-8, secondary node 110B acknowledges receipt of the update.

Figure 4:
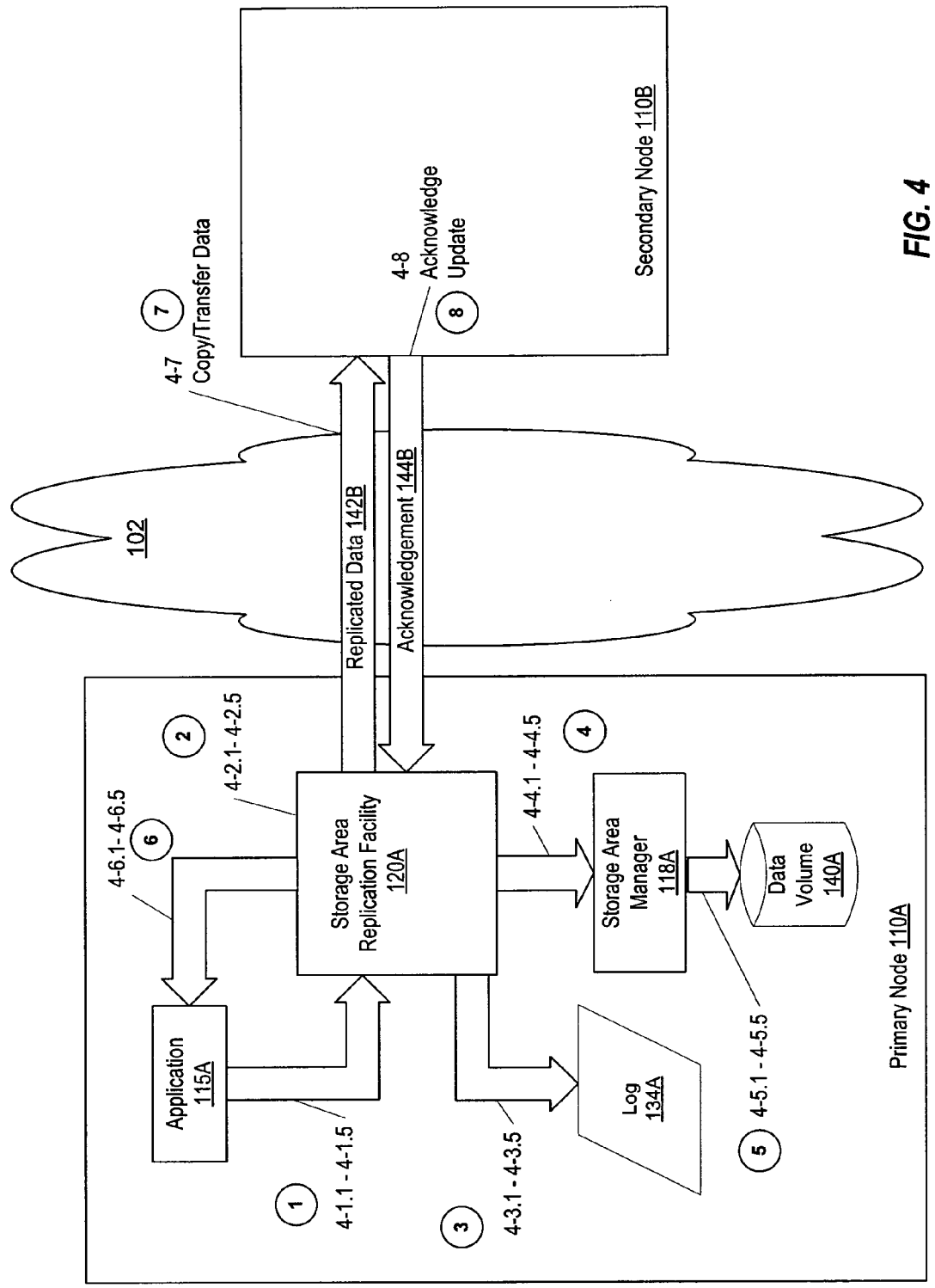
FIG. 4 illustrates a system for replicating data from a primary data volume to a secondary data volume according to an embodiment of the present invention.

FIG. 4 illustrates a system for replicating data from a primary data volume to a secondary data volume according to one embodiment of the present invention. Assume that the data in data volumes 140A and 140B (on primary node 110A and secondary node 110B, respectively) are initially synchronized. While a single data volume 140A has been illustrated with respect to FIG. 4, it should be appreciated that multiple data volumes may be provided and associated within a single shared log (e.g., log 134A) according to an alternative embodiment of the present invention. Operations 4-1.1 through 4-1.5 represent a set of requests by application 115 to write data values to a number of regions of data volume 140A.

Operations 4-2.1 through 4-2.5 represent a set of intercepts of the requests made in the set of operations 4-1.1 through 4-1.5 by storage area replication facility 120A. Operations 4-3.1 through 4-3.5 represent the storage of data associated with the write operations represented by operations 4-1.1 through 4-1.5 by storage area replication facility 120A within log 134A. According to one embodiment, the described operations 4-3.1 through 4-3.5 represent the storage of metadata such as that illustrated by the exemplary log of FIG. 5 further described herein. In another embodiment, the described operations represent the storage of the data requested to be written within log 134A in addition to the described metadata. In yet another embodiment, metadata as described is stored within log 134A via operations 4-3.1 through 4-3.5 and a point-in-time copy (e.g., a snapshot, storage checkpoint, etc.) is additionally created and used to store a copy of and/or reference data written during a corresponding tracking phase as described in greater detail herein.

Operations 4-4.1 through 4-4.5 represent issuing the respective writes and operations 4-5.1 through 4-5.5 represent writing the data to data volume 140A. Operations 4-6.1 through 4-6.5 represent notifying the initiating application 115A that the write operation(s) have completed. The numbering of the operations is not intended to imply that all of the set of operations 4-1.1 through 4-1.5 must be completed before the set of operations 4-2.1 through 4-2.5 can begin. Operations within each write operation, such as operations 4-1.1, 4-2.1, 4-3.1, 4-4.1, 4-5.1, and 4-6.1 (requesting the write through notifying the initiating application 115A) may occur in sequence.

When operations 4-1.1 through operations 4-6.5 are complete, the write operations associated with operations 4-1.1 through 4-1.5 are coalesced using the data stored within log 134A. Thereafter the resulting coalesced data is replicated to secondary node 110B. In operation 4-7, upon receiving replicated data 142B, activities occur on secondary node 110B to write the coalesced data to corresponding region(s) of a data volume on secondary node 110B. In operation 4-8, secondary node 110B acknowledges receipt of the update.

Figure 5:
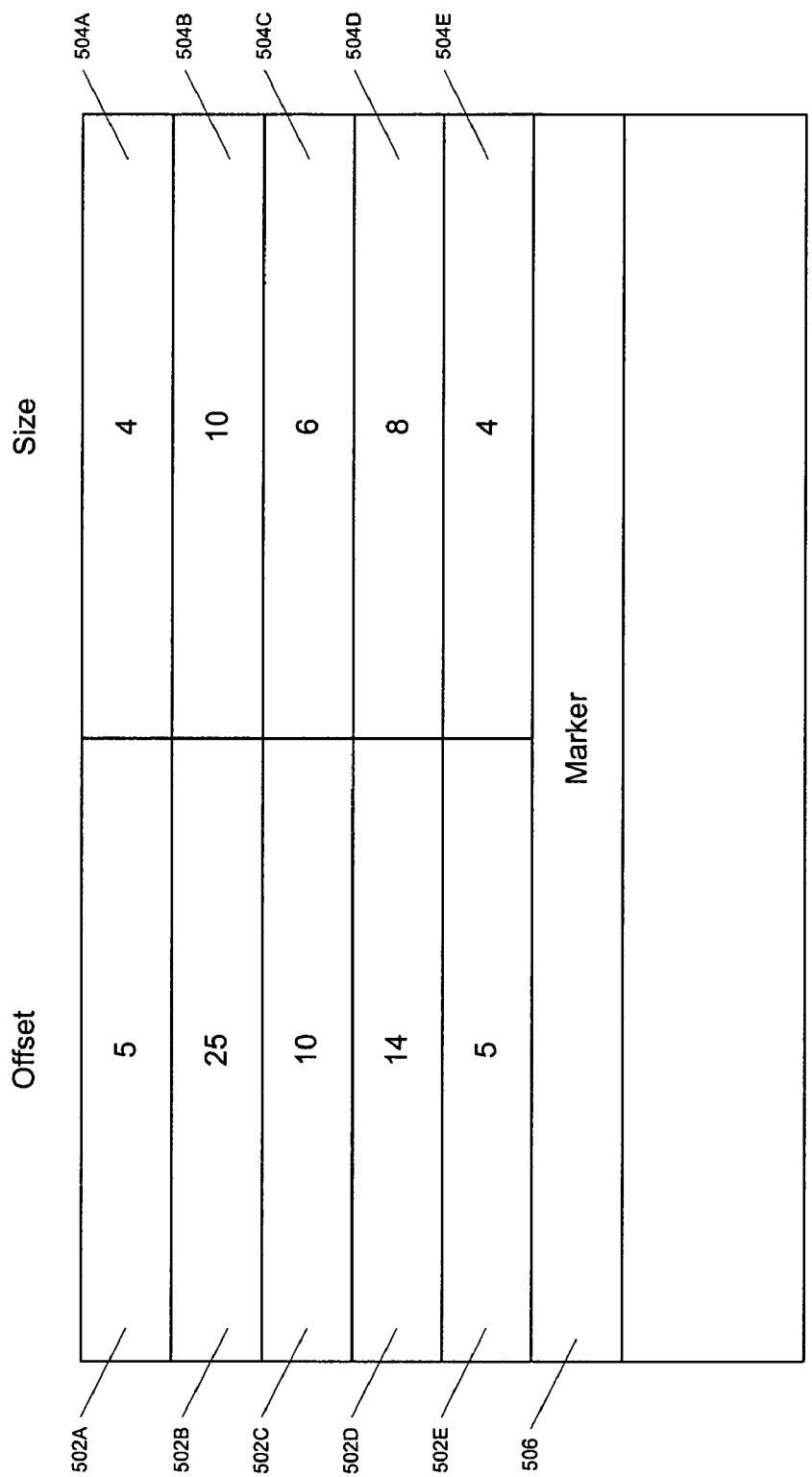
FIG. 5 illustrates a log according to an embodiment of the present invention.

FIG. 5 illustrates a log according to one embodiment of the present invention. The log of the illustrated embodiment includes metadata corresponding to a plurality of write operations comprising offset data 502A through 502E and size data 504A through 504E. In the illustrated embodiment, offset data 502 comprises data designating an offset from the beginning of the data volume or a region therein (e.g., a number specifying a number of bytes or blocks) at which the corresponding write begins. Similarly, the size data of the described embodiment indicates a whole number of bytes or blocks of data to be written.

For each write operation, an offset 502 and size 504 are specified and stored within the illustrated log as shown in write order (i.e., the order in which the write operations occurred). In the illustrated embodiment of FIG. 5, offset data 502A and size data 504A store metadata corresponding to the most-recent write operation while offset data 502E and size data 504E store metadata corresponding to the least-recent write operation. In an alternative embodiment of the present invention additional metadata (e.g. verification information) or the data associated with the write operations may be stored within the log (not shown). While offset and size data have been illustrated with respect to the embodiment of FIG. 5, it should be appreciated that other metadata could be substituted for the described offsets and sizes. For example, a specific address may be substituted in place of each offset data 502.

According to one embodiment, the illustrated log is implemented as a last in, first out (LIFO) or first in, last out (FILO) data structure (e.g., a queue, linked list, or the like). In the embodiment illustrated by FIG. 5, a marker 506 which may be used to indicate the beginning of a replication period is also depicted. Marker 506 may comprise a predetermined combination of bits or code or an offset 502 and/or size 504 having a particular attribute (e.g., a size data value of zero). The described marker 506 may be inserted into the log in-order prior to the interception of any write operations during the replication period, or alternatively, marker 506 may be injected into the log at some later time. While a particular number of write operations including specific offsets and sizes have been represented in FIG. 5, the illustrated write-operation metadata should be regarded in an illustrative rather than a limiting sense.

Figure 6:
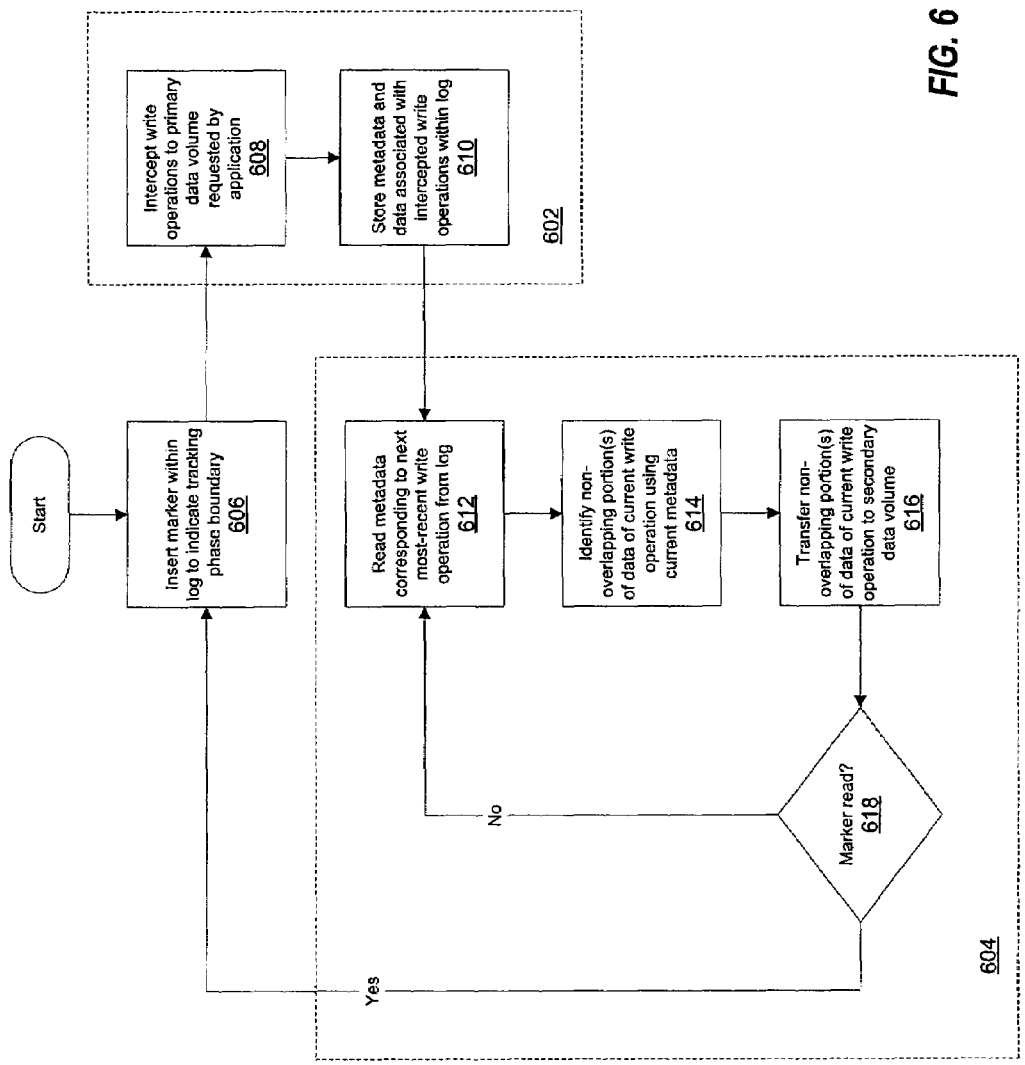
FIG. 6 illustrates a process for performing periodic replication using a log according to an embodiment of the present invention.

FIG. 6 illustrates a process for performing periodic replication using a log according to one embodiment of the present invention. Initially a marker is inserted within log to indicate a boundary between a tracking phase (process block 602) and a synchronization phase (process block 604). In alternative embodiments of the present invention the depicted marker insertion may be incorporated into either the described tracking phase or synchronization phase. In still other embodiments, the described marker may be eliminated entirely, for example, utilizing a different data structure.

Following the marker's insertion into the log, a tracking phase (process block 602) is entered in which any application-requested write operations are intercepted (e.g., by a storage replication facility such as that illustrated in FIG. 4) (process block 608) and metadata and data associated with intercepted write operations is stored within the log (process block 610). In the depicted embodiment, such metadata includes an offset indicating the location of the first portion of data (e.g., byte or word) to be written (e.g., by specifying a number of bytes or words offset from a known position or a unique location or address within a data volume) and a size indicating the total amount of data (e.g., bytes or words) to be written. In an alternative embodiment, verification or other information may similarly be included in the described metadata.

According to one alternative embodiment, only metadata is stored within the log and a point-in-time copy of the data volume to be replicated is generated to store the data written by any tracked write operations. In the described embodiment, a point-in-time copy is generated at the completion of a tracking phase, data is then read from the point-in-time copy during a corresponding synchronization phase to prevent corruption of the written data due to write operations to the same or overlapping locations which cross a replication cycle boundary. In another alternative embodiment of the present invention, metadata alone is stored within the log and data written by the tracked writes is stored solely within the primary data volume.

Metadata (and data associated with intercepted write operations) are stored in logical write order according to an embodiment of the present invention. In the described embodiment, storage for such metadata (and data) may be implemented and accessed within a last-in, first-out (LIFO) or first-in, last-out (FILO) data structure (e.g., a queue, linked list, or the like) such that the metadata (and data) may be easily read in reverse logical order as write operations are coalesced during synchronization. In one embodiment of the present invention, the transition between the illustrated tracking phase (process block 602) and a subsequent synchronization phase (process block 604) described in greater detail herein occurs as the result of the identification of a pre-defined tracking phase trigger (e.g., the expiration of a pre-defined time period, or the occurrence of a pre-defined event). In another embodiment, a tracking phase and a synchronization phase as described herein may overlap, occurring at least partially in parallel.

Thereafter in the illustrated embodiment, a synchronization phase (process block 604) is entered in which, beginning with metadata associated with the most recent write operation of a corresponding tracking phase, metadata corresponding to the next most-recent write operation (in other words, the write operation occurring just prior to the last write operation for which metadata has been read in time) is read from the log (process block 612). According to the illustrated embodiment, this is accomplished by reading back logged writes in the reverse logical order (e.g., LIFO) in which they were logged.

After the metadata of the next most-recent write operation is read, it is used to identify portion(s) of data of the write-operation which do not overlap with any preceding (i.e., occurring previously in time) write operation(s) (process block 614). Thus the write operations and corresponding data are coalesced to limit the amount of data which must be transferred via an associated network. In alternative embodiments of the present invention, data associated with any adjacent write operations or with a set of write operations (e.g., all write operations occurring with a periodic replication tracking period) may alternatively be coalesced at one time.

Once the non-overlapping data portion(s) have been identified, the coalesced data may be transferred over the described network to a secondary data volume (process block 616) to replicate the cumulative write operations. In an embodiment such as that depicted by FIG. 6 in which metadata is stored in reverse-write/LIFO order, the transfer of data from primary to secondary data volume may be performed at least partially in parallel with data coalescing. Alternatively, data transfer may begin once all data tracking and coalescing has concluded. In the illustrated embodiment of FIG. 6, data transfer is effected by copying the data to be written from the log and then transferring the generated copy to a secondary data volume. Data transfer may alternately take place between a point in time copy of the primary data volume or from the primary data volume itself according to alternative embodiments of the present invention described in greater detail herein.

After the data has been replicated to the secondary data volume, a determination is made within the illustrated process embodiment whether the inserted marker has been reached within the log (process block 618), indicating that all write operations requested during the current replication tracking phase have been processed. If not, the synchronization phase (process block 604) is continued as metadata corresponding to the next write operation within the log is read (process block 612). Otherwise, the synchronization phase is exited. In the illustrated process embodiment, the log may at this point be emptied and a new marker inserted (process block 606). In an alternative embodiment of the present invention, the described marker may remain in the log unchanged to indicate the end of the current synchronization phase.

Unlike traditional periodic replication which requires that the replication system stall any new writes to a data volume to obtain a frozen image for the creation of a point-in-time copy of associated data, embodiments of the present invention may be implemented in which such data volume/data set "freezing" in not required. Similarly, copy-on-write overhead associated with initial write operations made on point-in-time copies created to synchronize a remote secondary data volume site may be avoided using embodiments of the present invention. Moreover, embodiments of the present invention may be utilized to reduce the amount of data which is inefficiently or unnecessarily transmitted over an associated network.

According to one embodiment, the described offset and size data of each write which is read back from the log is maintained in memory of a data processing system including the primary data volume or, if memory space is a constraint, persistently in a global meta-data region of the log or on another storage device. Method embodiments of the present invention use no more storage than is used in asynchronous replication systems. Moreover, in embodiments where only meta-data is being stored within the log the storage required is comparable to that of conventional periodic replication. In embodiments where both metadata and data associated with write operations are logged, which replication technique uses less storage depends on the locality of writes and whether a copy-on-write technique is used for creating any point-in-time copies used in conventional periodic replication.

According to another embodiment of the present invention, a log is provided which can be shared for replicating to multiple remote sites using different replication modes (e.g., one in asynchronous replication mode and another in periodic replication mode). Thus allowing reuse of the underlying infrastructure as well as rapid and simplified replication mode changes (e.g., from periodic replication mode to asynchronous replication mode). In yet another embodiment, multiple logs (e.g., accessed using a round-robin algorithm), log data volume striping, and/or logs which may be simultaneously read from and written to are utilized to avoid degraded log access time.

In yet another embodiment of the present invention, the described technique for periodically replicating data is implemented in a distributed environment using techniques such as synchronized clocks, global distributed locks, region locks, token passing, etc. or by maintaining a unique log on each node or site. Where separate logs are maintained for each site, only metadata is logged and at the beginning of each synchronization phase a marker is inserted into the log on each node and a point-in-time copy of the data volume is created. The log on each node is then read back and a union of the set of changes logged in each log is created to arrive at the set of changes to be transmitted to the remote site. Determination of the combined set of changes may be accomplished before the modified data is transferred by performing the necessary processing as the logs are being read back in the reverse order.

Figure 7:
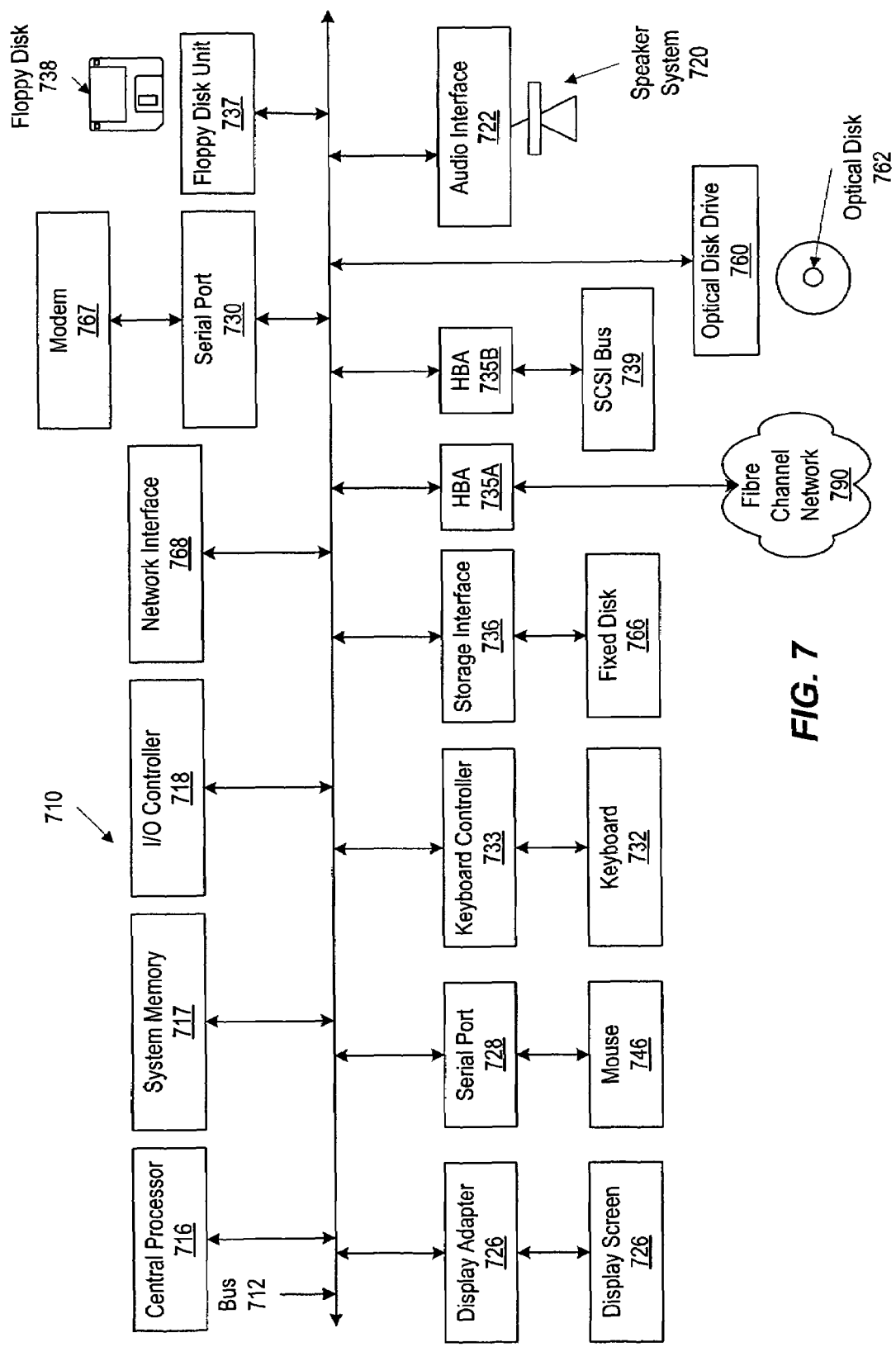
FIG. 7 illustrates a data processing system usable with one or more embodiments of the present invention.

FIG. 7 illustrates a data processing system usable with one or more embodiments of the present invention. Data processing system 710 includes a bus 712 which interconnects major subsystems of data processing system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a fibre channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with data processing system 710 are generally stored on and accessed via a computer readable medium, such as a hard disk drive (e.g., fixed disk 744), an optical drive (e.g., optical drive 740), floppy disk unit 737 or other storage medium. Additionally, applications may be in the form of electronic signals modulated in accordance with the application and data communication technology when accessed via network modem 747 or interface 748.

Storage interface 734, as with the other storage interfaces of data processing system 710, may connect to a standard computer readable medium for storage and/or retrieval of information, such as a fixed disk drive 744. Fixed disk drive 744 may be a part of data processing system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a data processing system such as that shown in FIG. 7 is readily known in the art and is not discussed in detail in this application. Code to implement the present invention may be stored in machine-readable storage media such as one or more of system memory 717, fixed disk 744, optical disk 742, or floppy disk 738. Additionally, data processing system 710 may be any kind of computing device, and so includes personal data assistants (PDAs), network elements or devices (e.g., switches, hardware or disk arrays, etc.), X-window terminals or other such computing devices. The operating system provided on data processing system 710 may be MS-DOS®, MS-WINDOWS®, OS/2®, UNIX®, Linux®, or another known operating system. Data processing system 710 also supports a number of Internet access tools, including, for example, an HTTP-compliant web browser having a JavaScript interpreter, such as Netscape Navigator®, Microsoft Explorer®, and the like.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future.

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method implemented by one or more computers, the method comprising:
   storing metadata for each of a plurality of write operations to a primary data volume within a log;
   wherein the plurality of write operations comprises first and second write operations comprising first and second data, respectively, wherein the metadata stored in the log for the first write operation comprises first information, wherein the first information defines a first extent of the primary data volume where the first data is written or is to be written and wherein the metadata stored in the log for the second write operation comprises second information, wherein the second information defines a second extent of the primary data volume where the second data is written or is to be written;
   comparing the first extent with the second extent to identify a portion(s) of the second extent that does not overlap with the first extent;
   replicating the first data and a portion of the second data that is written or is to be written to the portion(s) of the second extent that does not overlap with the first extent;
   wherein the first information comprises (1) a first offset from a beginning of the primary data volume, and (2) a first size data that defines the length of the first extent, and wherein the second information comprises (1) a second offset from the beginning of the primary data volume, and (2) a second size data that defines the length of the second extent.

2. The method of claim 1, further comprising:
   storing the first and second data written by each of said first and second write operations within said log.

3. The method of claim 1, further comprising:
   storing the first or second data within a point-in-time copy of said primary data volume.

4. The method of claim 1, wherein said storing metadata comprises,
   storing metadata for each of said plurality of write operations in a first order within said log.

5. The method of claim 4, wherein storing metadata for each of said plurality of write operations in a first order within said log comprises:
   storing metadata for each of said plurality of write operations in write order within said log.

6. The method of claim 4 further comprising reading metadata from said log in a second order, wherein said second order is a reverse of said first order.

7. The method of claim 6 further comprising storing a marker within said log.

8. The method of claim 1, wherein said replicating comprises writing the first data and the portion of the second data that is written or is to be written to the portion(s) of the second extent that does not overlap with the first extent to a secondary data volume.

9. An apparatus comprising:
   means for storing metadata for each of a plurality of write operations to a primary data volume within a log;
   wherein the plurality of write operations comprises first and second write operations comprising first and second data, respectively, wherein the metadata stored in the log for the first write operation comprises first information, wherein the first information defines a first extent of the primary data volume where the first data is written or is to be written and wherein the metadata stored in the log for the second write operation comprises second information, wherein the second information defines a second extent of the primary data volume where the second data is written or is to be written;
   means for comparing the first extent with the second extent to identify a portion(s) of the second extent that does not overlap with the first extent;
   means for replicating the first data and a portion of the second data that is written or is to be written to the portion(s) of the second extent that does not overlap with the first extent;
   wherein the first information comprises (1) a first offset from a beginning of the primary data volume, and (2) a first size data that defines the length of the first extent, and wherein the second information comprises (1) a second offset from the beginning of the primary data volume, and (2) a second size data that defines the length of the second extent.

10. The apparatus of claim 9, further comprising:
   means for storing first and second data within said log.

11. The apparatus of claim 9, wherein,
   said means for storing metadata comprises means for storing metadata for each of said plurality of write operations in a first logical order within said log.

12. A machine-readable storage medium having a plurality of instructions executable by a machine embodied therein, wherein said plurality of instructions, when executed, cause said machine to perform a method comprising:
   storing metadata for each of a plurality of write operations to a primary data volume within a log;
   wherein the plurality of write operations comprises first and second write operations comprising first and second data, respectively, wherein the metadata stored in the log for the first write operation comprises first information, wherein the first information defines a first extent of the primary data volume where the first data is written or is to be written and wherein the metadata stored in the log for the second write operation comprises second information, wherein the second information defines a second extent of the primary data volume where the second data is written or is to be written;

comparing the first extent with the second extent to identify a portion(s) of the second extent that does not overlap with the first extent;

replicating the first data and a portion of the second data that is written or is to be written to the portion(s) of the second extent that does not overlap with the first extent;

wherein the first information comprises (1) a first offset from a beginning of the primary data volume, and (2) a first size data that defines the length of the first extent, and wherein the second information comprises (1) a second offset from the beginning of the primary data volume, and (2) a second size data that defines the length of the second extent.

13. The machine-readable storage medium of claim 12, said method further comprising:

storing the first and second data within said log.

14. The machine-readable storage medium of claim 12, wherein, said storing metadata comprises storing metadata for each of said plurality of write operations in a first logical order within said log.

15. A system comprising:

a memory and a processor;

a primary data volume; and a log for storing metadata for first and second write operations comprising first and second data, respectively, wherein the metadata for the first write operation comprises first information, wherein the first information defines a first extent of the primary data volume where the first data is written or is to be written and wherein the metadata for the second write operation comprises second information, wherein the second information defines a second extent of the primary data volume where the second data is written or is to be written;

a circuit for comparing the first extent with the second extent to identify a portion(s) of the second extent that does not overlap with the first extent;

a circuit for replicating the first data and a portion of the second data that is written or is to be written to the portion(s) of the second extent that does not overlap with the first extent;

wherein the first information comprises (1) a first offset from a beginning of the primary data volume, and (2) a first size data that defines the length of the first extent, and wherein the second information comprises (1) a second offset from the beginning of the primary data volume, and (2) a second size data that defines the length of the second extent.

* * * * *